Feb. 10, 1942.　　A. M. ROSSMAN　　2,272,226
STEAM ENGINE
Filed Oct. 8, 1938　　8 Sheets-Sheet 1
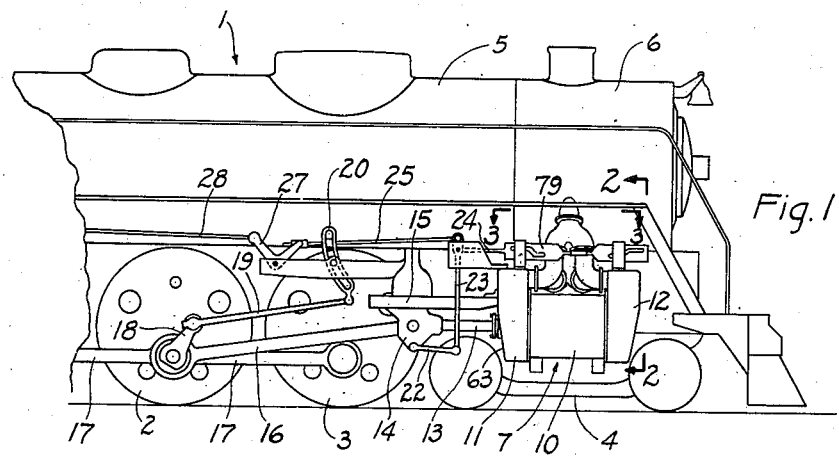
INVENTOR.
Allen M. Rossman
BY Morris Spector,
ATTORNEY.

Feb. 10, 1942.  A. M. ROSSMAN  2,272,226
STEAM ENGINE
Filed Oct. 8, 1938  8 Sheets-Sheet 2

INVENTOR.
Allen M. Rossman
BY Morris Spector,
ATTORNEY.

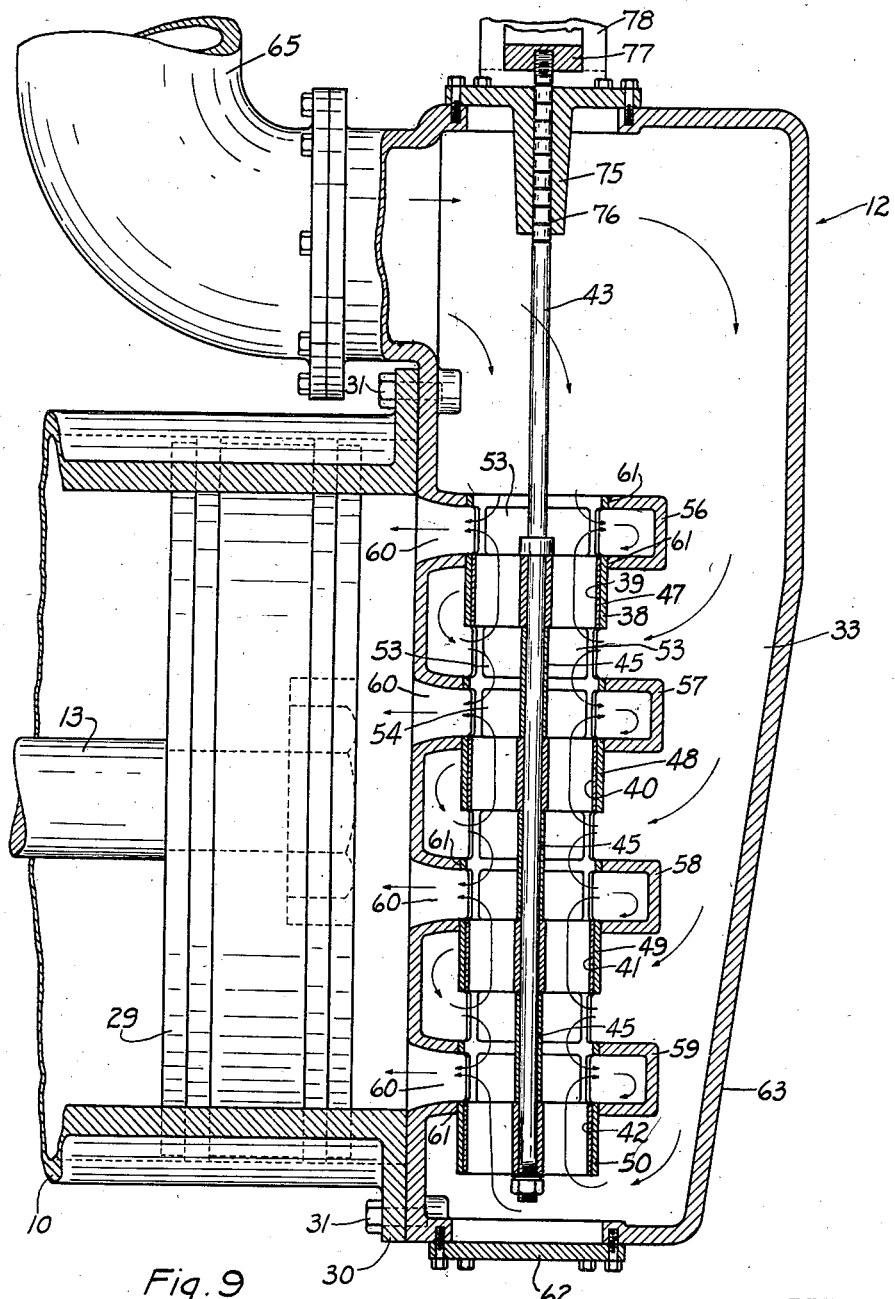

Feb. 10, 1942.　　A. M. ROSSMAN　　2,272,226

STEAM ENGINE

Filed Oct. 8, 1938　　8 Sheets-Sheet 5

INVENTOR.
Allen M. Rossman
BY Morris Spector
ATTORNEY.

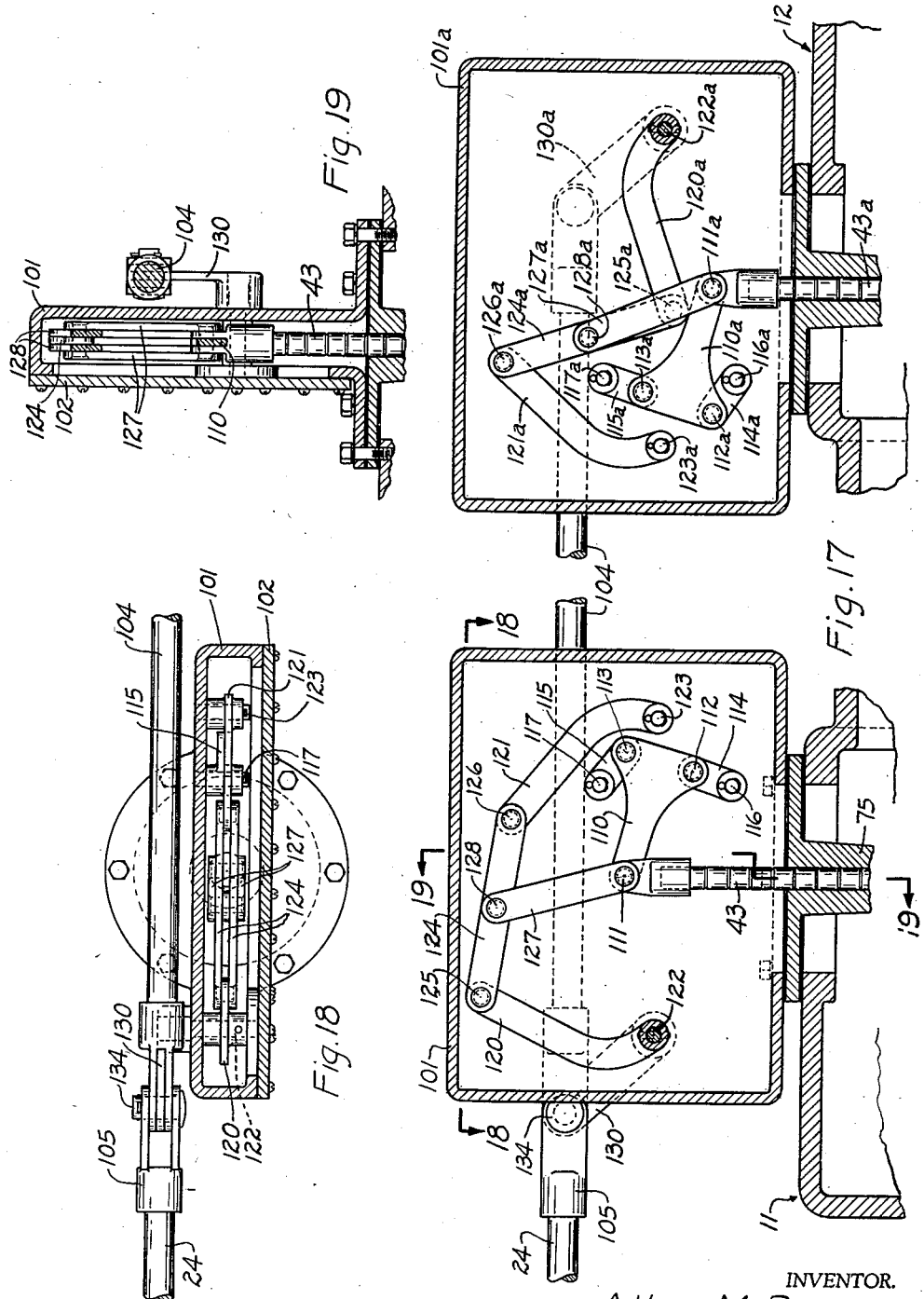

Feb. 10, 1942. A. M. ROSSMAN 2,272,226
STEAM ENGINE
Filed Oct. 8, 1938 8 Sheets-Sheet 7
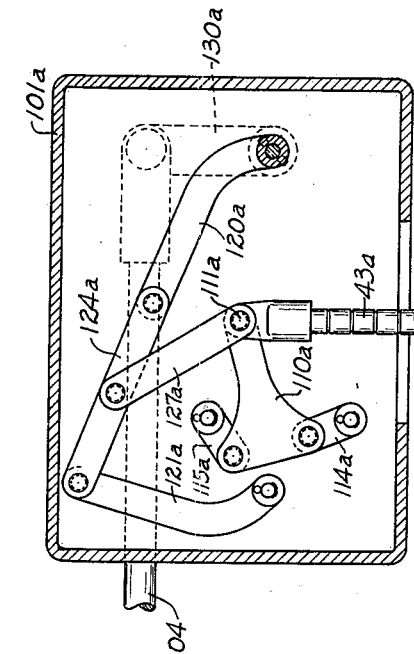
Fig. 20
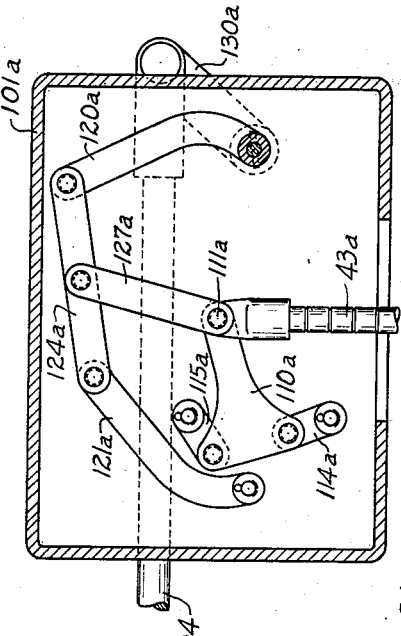
Fig. 21
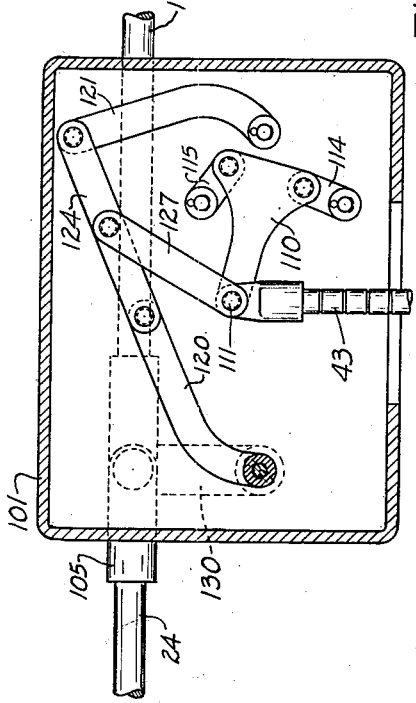
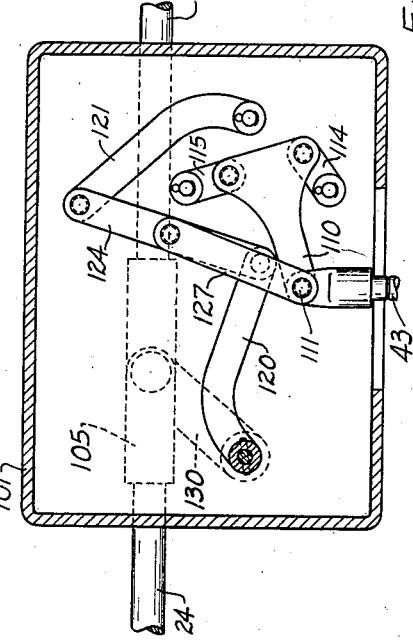
INVENTOR.
Allen M. Rossman
BY Morris Spector,
ATTORNEY.

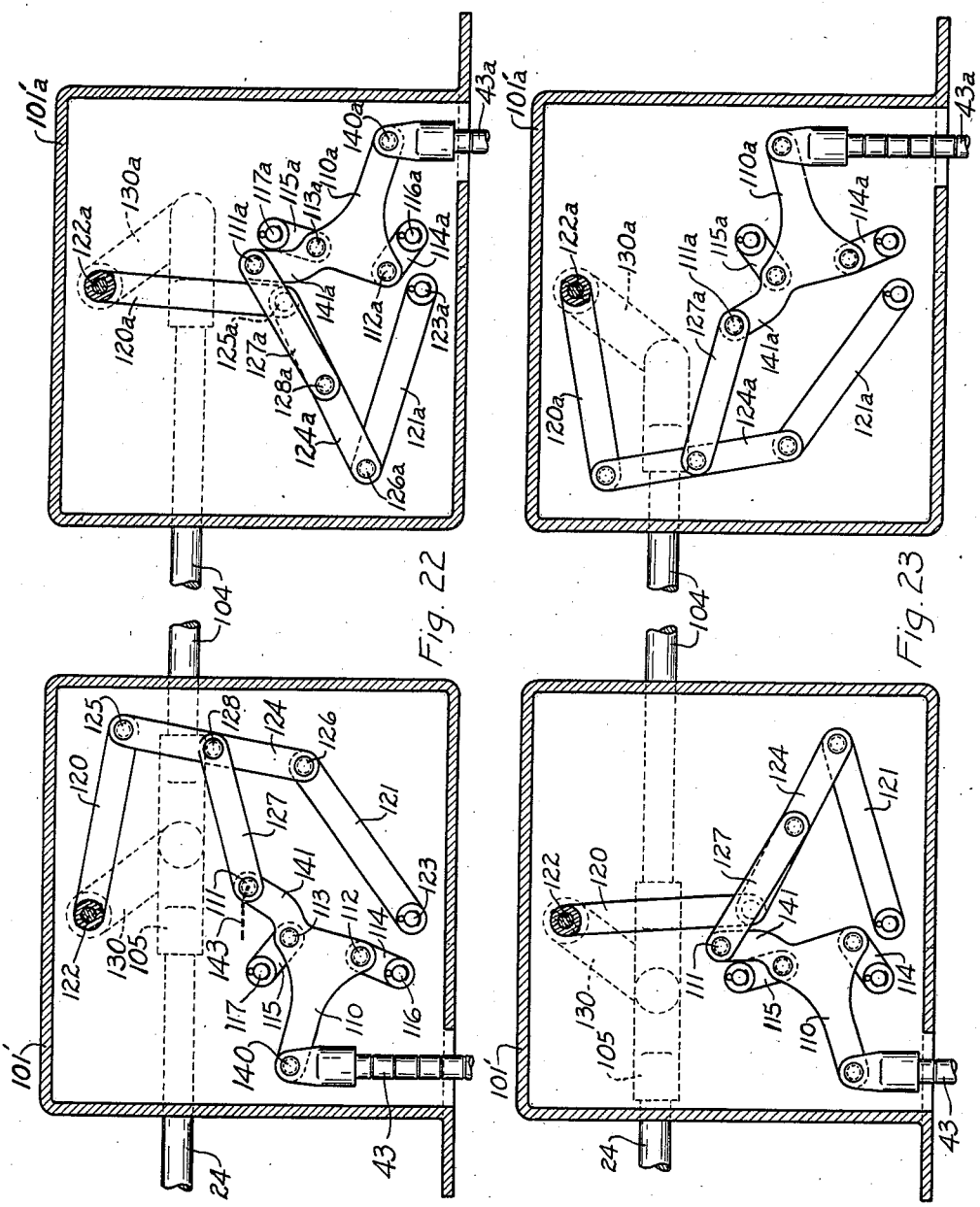

Patented Feb. 10, 1942

2,272,226

UNITED STATES PATENT OFFICE 2,272,226

STEAM ENGINE

Allen M. Rossman, Wilmette, Ill.

Application October 8, 1938, Serial No. 233,997

14 Claims. (Cl. 121—124)

This invention relates to steam engines in general and particularly to such engines as are adapted for use as driving engines for railroad locomotives.

The single valve steam engine of the type that is now in common use on railroad locomotives is one of the least efficient of all the well known types of reciprocating steam engines. The four valve engine is more efficient but present types of four valve engines generally are subject to other limitations which preclude their use on railroad locomotives.

It is one of the objects of the present invention to provide a steam engine having an efficiency comparable with the efficiency of present day four valve steam engines and which is capable of operation at speeds, steam pressures and degrees of superheat encountered in railway locomotives, and which will be of such size and construction as to enable its use on a railway locomotive. Steam engines for use on railway locomotives must necessarily be fast acting, and must generally be capable of operating at speeds above 300 R. P. M. As a result, the amount of time available for steam admission and steam exhaust is very small and therefore the valve construction must be such as to permit a rapid rate of steam flow. At the same time the valve should preferably be small in size and light in weight.

It is one of the objects of the present invention to provide a steam engine with means for admitting or exhausting the steam in a plurality of streams through a plurality of ports whereby a rapid flow of a large volume of steam can be had. It is a further object of the present invention to provide a valve structure which has a small movement from its open to its closed position, or vice versa, and yet covers and uncovers large areas for steam flow. In the preferred embodiment of the present invention separate valves are provided for the steam admission and for the steam exhaust. The exhaust steam chamber is separated from the live steam chest by an air space so that there cannot be any appreciable heat loss by conduction or radiation from the live steam chest to the exhaust steam chamber.

It is a still further object of the present invention to provide a steam engine with a valve structure wherein both the valve, and its contiguous supporting structure are almost entirely surrounded by steam at the same temperature so that they tend to expand and contract simultaneously and in equal increments. As a result there is little tendency for the relatively movable valve parts to bind due to unequal expansion or contraction of the valve and its supporting structure.

It is a still further object of the present invention to provide a four valve steam engine wherein each valve controls a plurality of steam ducts and the valves are located directly within the cylinder heads, rather than above the cylinders, in order that the steam ducts leading from the valve to the engine cylinder may be as short as possible and that the clearance volume of the cylinder may thereby be kept to a minimum.

It is another object of the present invention to provide a steam engine with a valve which may be constructed to control any number of ducts and which will be simple in construction and balanced insofar as concerns steam pressures. The use of a plurality of streams of steam permits the use of much smaller valves than would be required if all the steam were handled in a single stream.

It is a still further object of the present invention to provide a steam engine having sliding valves and wherein the valve stems extend in a direction perpendicular to the main axis of the cylinder. It is a still further object of the present invention to provide such a structure wherein the valve stems move rectilinearly between the open and the closed positions and wherein the extent of movement between the closed and the extreme open positions is maintained at a minimum.

In the engine herein shown for illustrative purposes each of the valves is positioned vertically in its cylinder head and is moved up and down to open and close the steam ducts. While a cam could be used to operate each valve, and this is illustrated in one embodiment of the present invention, there are many installations wherein the size of the valve and the maximum speed of the engine are such that a positive connection between the valve and the reversing gear is preferable. It is an object of the present invention to provide an operating linkage having a positive connection with the valve stem for operating the valve and wherein two valves at opposite ends of the engine cylinder are operated by a common rod. A Walschaert, Baker, or equivalent type of valve reversing gear, can be used to actuate the common rod for controlling the two valves.

The linkage which interconnects the common rod and the stem of each valve is so constructed that for a given portion of the range of movement of the rod there is no, or substantially no, movement of the connected valve stem, and the motion of the two linkages operatively connected to the common rod are so correlated that the rod moves one valve from the closed to the wide open position while transmitting almost no movement to the second valve. It then closes the first valve, brings it to rest, then moves the second valve from the closed to the wide open position while transmitting almost no movement to the first valve. A second group of links is provided for guiding each valve stem in a straight line. It is one of the objects of the present invention to provide linkages of each of the above mentioned characters for operating and guiding each valve stem, both of which can be enclosed in the same sealed housing and operated in a bath of oil. The housing may be bolted to the cylinder head so that the complete assembly of cylinder head, two valves and the two valve operating linkages of each valve can be handled as a single unit. This unit can be assembled and all necessary adjustments on it can be made at a work bench before it is attached to the engine cylinder.

It is a further object of the present invention to provide a four valve steam engine capable of operation on a railroad locomotive and which is of such construction as to enable its application to existing steam locomotives with a minimum amount of change in the existing locomotive structure. In many cases the principal modifications of the locomotive will comprise removing the existing valve chests and re-boring the cylinders. The principal new parts required for the conversion will be cylinder liners to close off the steam ports in the old cylinders, new cylinder heads with built-in valves and valve operating mechanism secured thereto, and parts of the steam piping.

The attainment of the above and further objects of the present invention will be apparent from the following specification taken in conjunction with the accompanying drawings forming a part thereof.

In the drawings:

Figure 1 is a fragmentary side view of the front portion of a locomotive embodying the present invention;

Figure 2 is a fragmentary sectional view taken along the line 2—2 of Figure 1 and looking in the direction of the arrows;

Figure 3 is a fragmentary view taken along the line 3—3 of Figure 1 and showing only one of the steam engines;

Figure 9 is a sectional view taken along the line 9—9 of Figure 4 and looking in the direction of the arrows;

Figure 17 is a sectional view through a modified form of valve operating means, showing one position of the linkages for the valves at opposite ends of the cylinder;

Figure 18 is a sectional view taken along the line 18—18 of Figure 17;

Figure 19 is a sectional view taken along the line 19—19 of Figure 17;

Figure 20 is a view corresponding to Figure 17 but showing the operating linkage in an intermediate position;

Figure 21 is a view corresponding to Figure 17 but showing the operating linkage in an alternate position; and Figures 22 and 23 are sectional views of a modified form of valve operating linkage showing the links and cranks in alternate positions, corresponding to the positions illustrated in Figures 17 and 21, respectively.

Figure 5:
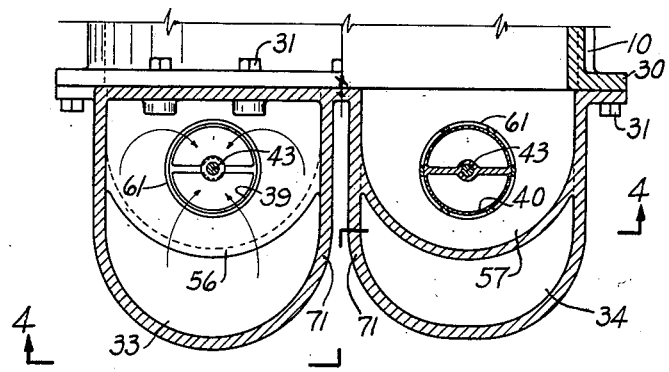
Figure 5 is a sectional view taken along the line 5—5 of Figure 4.

Reference may now be had more particularly to Figures 1 and 2. In these figures there has been shown a portion of the front of a locomotive 1 embodying the principles of the present invention. This locomotive includes the usual driving wheels of which only the wheels 2—3 are shown, and the usual front engine truck 4. A boiler is indicated at 5, and the usual smoke box at 6. The boiler supplies steam to four-valve steam engines 7 and 8 embodying the present invention, which engines are shown as located in the usual places toward the front of the locomotive.

The two engines 7 and 8 are of identical construction except that one is right handed and the other left handed, and therefore a description of one will suffice also for the other. The engine 7 is a double acting engine and includes a cylinder 10, rear cylinder head 11 and front cylinder head 12, and the usual piston rod 13. The piston rod is connected to a cross head 14 in the usual manner. The cross head moves in a cross head guide 15 and is connected to the driving wheels by a main drive rod 16 and side rods 17—17.

A Walschaert, Baker, or equivalent type of valve reversing gear is provided for operating the valves. It should have two links per cylinder, rigidly connected together, one for the two admission valves and the other for the two exhaust valves. In the drawings a Walschaert gear has been shown for illustrative purposes. While the admission valves must be controlled to give various points of cut off, the exhaust valves need have but two operating points, namely, one for each direction of motion of the locomotive. The reversing gear illustrated includes the usual eccentric crank 18, which is connected through an eccentric rod 19 to the usual arcuate sector 20 that constitutes a part of the valve control mechanism. The cross head 14 also imparts a component of motion to the valve control mechanism by means of a link 22 and a link 23. The link 23 is pivotally connected to a valve control rod 24, and is also connected to a radius bar 25 which has sliding connection with the arcuate sector 20, and with the lifting arm of a pivoted bell crank 27 that is controlled from the driver's cab by means of a reach rod 28 in the usual manner.

Figure 14:
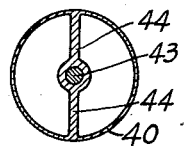
Figure 14 is a sectional view taken along the line 14—14 of Figure 13.
Figure 10:
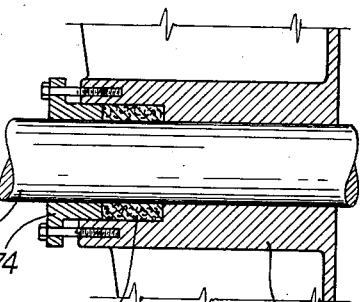
Figure 10 is a fragmentary sectional view taken along the line 10—10 of Figure 7.
Figure 11:
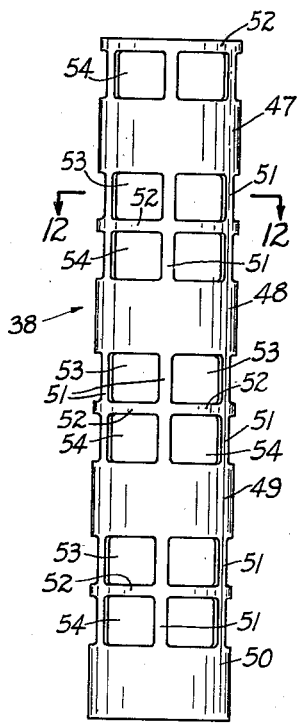
Figure 11 is a front view of the ported sleeve of one of the valves of the steam engine.
Figure 13:
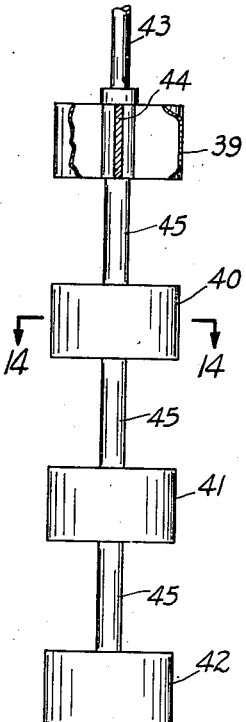
Figure 13 is a side view in partial section of the four ring valve assembly for opening and closing the steam ports.
Figure 16:
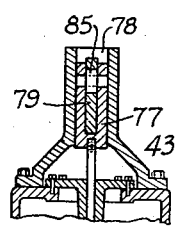
Figure 16 is a sectional view taken along the line 16—16 of Figure 15.

An explanation will now be given of the construction of the steam engine 7 and of the valve structure for controlling the steam admission and steam exhaust. The engine is a double acting engine and includes a piston 29 reciprocating in the cylinder 10 (Fig. 9), and is provided with cylinder heads at opposite ends of the cylinder and valve mechanism, so arranged that when steam is admitted into the cylinder at one end it is exhausted from the cylinder at the other end. When the piston has reached the opposite end of the cylinder the action is reversed. The point of cut off of steam is controlled in the usual manner. The cylinder 10 is provided with a flange 30 at each end for receiving a cylinder head. The cylinder head 12 at the forward end of the cylinder 10 is bolted or otherwise secured to the cylinder flange 30 by a series of bolts 31. The cylinder head carries two chambers, namely, a live steam chamber 33 and an exhaust steam chamber 34. The valve in the live steam chamber and the valve in the exhaust steam chamber can be of identical construction. Each valve chamber carries a stationary ported cylindrical sleeve 38 within which there is mounted a movable valve member comprising a plurality of rings 39, 40, 41 and 42 mounted on a common rod 43 by means of struts 44, as are illustrated in Figures 9, 13 and 14. The rod extends through a central opening in the struts 44 of each of the rings, and the rings are properly spaced apart by spacer tubes 45 on the rod 43 between adjacent rings. The stationary ported cylindrical sleeve 38, as is illustrated in Figure 11, includes imperforate ring portions 47, 48, 49 and 50 joined by perforated portions including vertical connecting ribs 51 and circular ribs 52 forming openings or ports 53 and 54 for the passage of steam from the interior of the stationary ported cylindrical sleeve 38 to the exterior thereof, and vice versa. The wall of the cylinder head has a plurality of spaced folds constituting thick hollow ribs 56, 57, 58 and 59 which extend into each of the chambers 33 and 34. The hollow portion which is embraced by the fold of each rib, 56—59, opens into the cylinder 10 by ports or passageways 60, and the horizontal walls of the ribs 56—59 are provided with aligned circular openings 61—61 for establishing communication between the passageways 60 and the associated steam chamber 33 or 34. The ported cylindrical sleeve 38 is passed through said openings 61 and is rigidly secured in position either by shrinking or by a press fit. The ports 54 in the cylindrical sleeve 38 open into the passageways 60 leading to the interior of the engine cylinder 10. The ports 53 in the cylindrical sleeve of the steam admission valve open into the live steam chamber 33, while those of the exhaust valve open into the exhaust chamber 34. When the valve is in the position illustrated in Figure 9 the rings 39—42 are in position opposite the imperforate ring portions 47—50 thereby leaving the ports uncovered. There is thus direct communication between the passageways 60 and the live steam chamber 33, namely, through the ported cylindrical sleeve 38, thence through the four passageways 60 to the interior of the steam cylinder 10. When the valve is raised to bring the rings 39—42 into position to cover the ports 54 communication between the live steam chamber and the passageways 60 is closed.

It is to be noted that the valve and the cylindrical sleeve are almost entirely immersed in steam so that there is a substantially simultaneous and uniform expansion and contraction of the various sliding parts, which tends to prevent binding. Furthermore, should there be any lateral misalignment of the rings 39, 40, 41 and 42 this will be compensated for by a corresponding slight flexing of the rod 43. When the steam in the cylinder has performed its work and is about to be exhausted, the temperature thereof has changed appreciably from the temperature of the live steam. The only parts within the cylinder head that are subjected, alternately, to the temperatures of live and exhaust steam are the inner surfaces of the hollow portions which are embraced by folds of the ribs 56, 57, 58 and 59. The outer surfaces of these folds are always at the same temperature, namely, the temperature of the live steam in the case of the admission valve and the temperature of the exhaust steam in the case of the exhaust valve. During the time when there is a temperature difference on opposite sides of these walls there is substantially no movement of steam across opposite surfaces thereof. Steam sweeps across opposite surfaces only when the valve is open, and at that time the temperatures on opposite surfaces are equal. In the usual single valve type of steam engine the exhaust steam, in passing through the exhaust valve, sweeps across large surfaces of metal, the opposite sides of which are in contact with the live steam. This sweeping movement of the exhaust steam is conducive to a large heat transfer from live steam to exhaust steam. This is eliminated by the present construction.

In order to facilitate insertion or removal of the valve stem and its associated rings and of cylindrical sleeve 38, the bottom of the cylinder head is provided with a circular opening which is closed by a movable plate 62 that may be bolted or otherwise suitably secured in place.

The end of the cylinder head is tapered axially inwardly adjacent the bottom, as indicated at 63 in Figures 1 and 9. This reduces the cross sectional area of the cylinder head adjacent the bottom thereof, where the volume of steam flow is less than adjacent the upper portion, so that the velocity of steam flow through various parts of the cylinder head may be maintained approximately the same, and it also cuts down on the weight of the cylinder head. In addition this taper increases the clearance space between the engine and the wheels of the front engine truck 4, as may be seen from Figure 1.

The admission chambers 33' and 33 at opposite ends of the cylinder are connected by steam pipes 64 and 65 to a steam pipe or header 66 that receives steam from the boiler of the locomotive. The exhaust chambers 34' and 34 are connected by pipes 67—68 to a common pipe 69 which in turn discharges the steam at 70 into the smoke box in the usual manner, the exhaust steam ultimately discharging into the stack, as is known in the art.

When the steam admission valve in the cylinder head 12 is open, steam flows from the header 66 to the pipe 65, then into the chamber 33. From there the steam follows the path of the arrows, as indicated in Figure 9, to the ports 53 and the two ends of the cylindrical sleeve 38, thence to the four ports 54 and through those ports to the four passageways 60. At that time the adjacent exhaust valve in the cylinder head 12 is closed. Steam thus continues to flow into the cylinder through the four passageways 60 as long as the steam admission valve is open. After the admission valve is closed and the steam has expanded within the cylinder and moved the piston nearly to the opposite end of the cylinder, the adjacent exhaust valve opens. Steam then flows from the cylinder 10 into the exhaust chamber 34 in a direction opposite that illustrated in Figure 9. The exhaust steam passageways can be of the same construction as the live steam passageways.

One side of the wall between the cylinder and the chamber 33, including the folds 56—59, is always in contact with the live steam in said chamber. Therefore, there can be no condensation of steam on the other side of that wall when steam is being exhausted from the adjacent side of the cylinder. The net effect of this is that approximately one-half of each end of the cylinder is steam jacketed, thereby substantially reducing the condensation in the cylinder.

Figure 7:
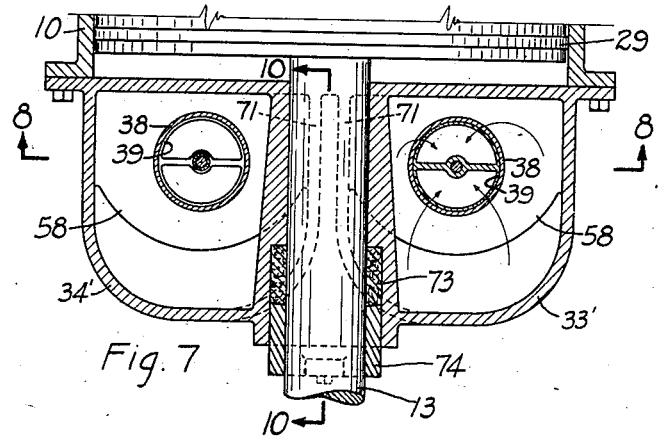
Figure 7 is a fragmentary sectional view taken along the line 7—7 of Figure 8 and showing the construction of the portion of the cylinder head through which the piston rod extends.
Figure 8:
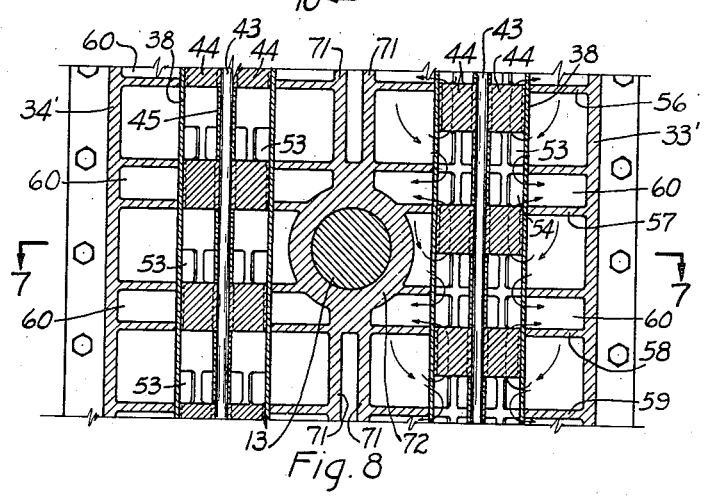
Figure 8 is a fragmentary sectional view taken along the line 8—8 of Figure 7.

The cylinder head 11 at the left side of the engine, as seen in Figure 3, includes means forming an admission chamber 33' and an exhaust chamber 34' with folds and valves similar to the chambers 33 and 34 and their valves. The cylinder head 11 is, however, of somewhat different construction to allow for the passage of the piston rod 13 through the cylinder head 11 and to provide the usual packing for the piston rod. This is illustrated in Figures 7 and 8. In this cylinder head the walls 71 merge at their center to provide a sleeve portion 72 for the piston rod 13, the usual piston rod packing 73 and packing ring 74 being provided.

The admission and exhaust of steam from the cylinder is accomplished by raising and lowering the appropriate valves in proper sequence. For this purpose each valve stem 43 extends through a gland 75 that is bolted or otherwise secured to the cylinder head and enters into the steam chamber of the cylinder head. No packing is shown around the valve stems as any of the well known types of steam seals in common use on stems of valves of steam engines may be used. In the structure here illustrated this steam seal comprises a series of grooves 76 turned on the stem, which grooves fill with condensed steam and prevent the free egress of live steam.

Figure 4:
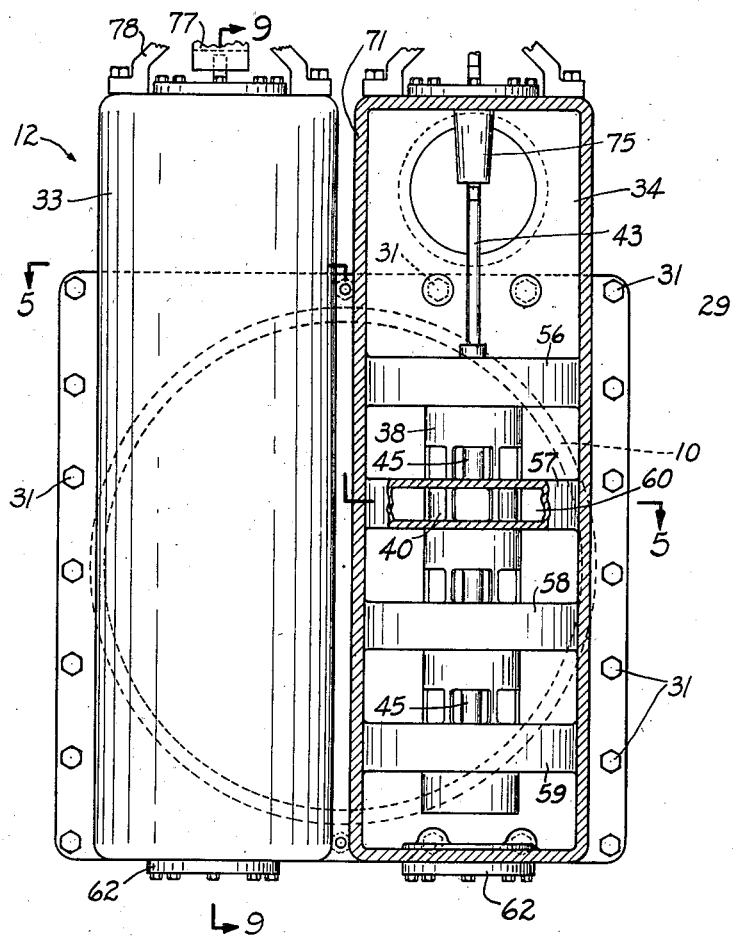
Figure 4 is an end view, in partial section, of the steam engine, said view being taken along the line 4—4 of Figures 3 and 5.
Figure 6:
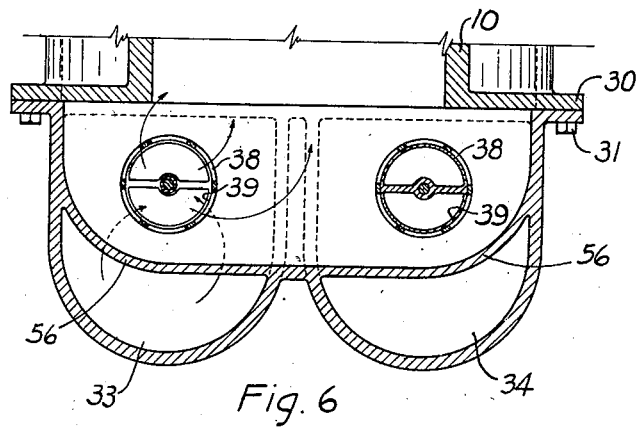
Figure 6 is a sectional view similar to Figure 5 and illustrating a modified construction.
Figure 12:
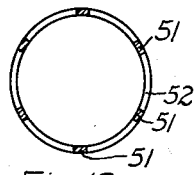
Figure 12 is a sectional view taken along the line 12—12 of Figure 11.

In Figure 6 I have shown a modified construction for the top rib of a cylinder head. This view is a view corresponding to Figure 5, which is through an intermediate rib. In this modified construction the folds of the top rib 56 on the intake and on the exhaust side of the cylinder head are in communication, so that steam from the live steam chamber 33 which flows through the valve at the space between the folds of the top rib 56 can move laterally into the space between the folds of the top rib 56 of the exhaust chamber 34 as it moves into the cylinder 10. This is provided in order to increase the effective length of the topmost part 60 to compensate for the diminution in length that results by reason of the curvature of the cylinder 10. As may be seen from Figure 4, the cylinder 10 is opposite above five-eighths of the length of the port between the folds of the top rib 56, the remaining length being covered by reason of the curvature of the cylinder. In order to compensate for this diminution in length the corresponding admission and exhaust passageways of the top fold 56 may be designed to be in communication with one another, as is illustrated in Figure 6. A similar construction is provided at the bottom port formed by the fold of the rib 59. There is no substantial objection to such communication between these ports 60 since when the admission valve is open the exhaust valve is closed and, conversely, when the exhaust valve is open the admission valve is closed.

Reference may now be had more particularly to Figures 1, 3, 15 and 16 for an understanding of one manner of opening and closing the valves. Each of the valve stems 43 which extend upwardly from the cylinder heads 11 and 12 has a U-shaped yoke 77 secured to the top thereof, which yoke is guided in an up and down movement between the sides of a square sleeve 78 that is bolted to the cylinder head. The yoke 77 on the steam admission valve stem of the cylinder head 11 receives a cam plate 79 between the arms thereof, which cam plate slides through slots in the sleeve 78. A similar cam plate 79' extends between the arms of the corresponding yoke on the steam admission valve stem of the cylinder head 12. The two cam plates are interconnected by rods 80—81 and an adjusting turn buckle or the like 82. The cam plate 79 is adapted for movement in a horizontal direction through the yoke 77 and has a cam slot 84 formed therein. A roller or pin 85 is journalled in the arms of the yoke 77 and extends through the cam slot 84. A similar construction is provided for the cam slot 87 of the cam plate 79'. The cam plate 79 is connected to the valve control rod 24, as may be seen from Figure 1.

Figure 15:
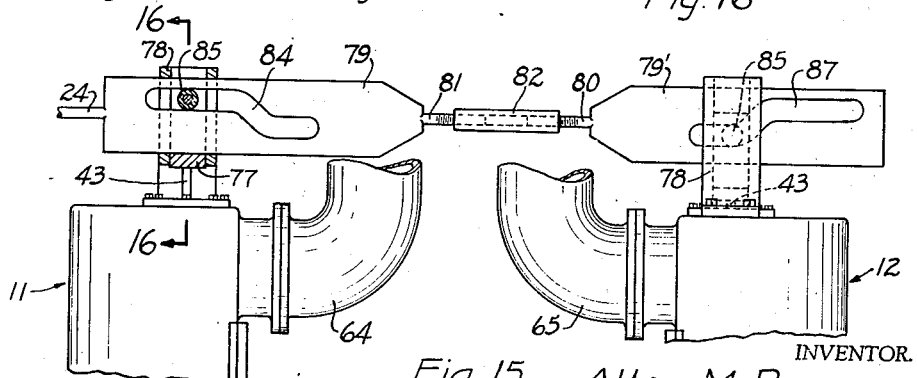
Figure 15 is a fragmentary view illustrating one type of operating connection for raising and lowering a pair of valves at opposite ends of the cylinder, said view being taken along the line 15—15 of Figure 3.

When the valves are in the position illustrated in Figure 15, the steam admission valve in the cylinder head 11 is closed and the steam admission valve in the cylinder 12 is open, namely, in the position illustrated in Figure 9. Steam thus enters the cylinder from the cylinder head 12 and commences to move the piston 29 to the left from the position illustrated in Figure 9. If the cam plates 79—79' are moved to the left from the position illustrated in Figure 15, the initial movement of the cam plates produces no effect on the steam admission valve in the cylinder head 11, because at that time the roller 85 is riding in the top horizontal portion of the cam slot 84. The corresponding roller of the valve for controlling the admission of steam into the cylinder from the cylinder head 12 rises in the cam slot 87, thus lifting the valve stem 43 of that valve and closing the steam admission valve in the cylinder head 12 so that the admission of steam into the cylinder through that cylinder head is cut off. Continued movement of the cam plates 79—79' at first produces no effect. In the meantime the piston 29 moves to the left within the cylinder until it reaches its extreme position. At the proper time when steam is to be admitted into the cylinder from the cylinder head 11 the cam plate 79 reaches a position such that the inclined portion of the cam slot 84 is opposite the roller 85. Further movement of the cam plate 79 to the left causes the roller 85 to ride down the inclined portion of the cam slot and force the valve stem 43 of the steam admission valve within the cylinder head 11 to move downwardly to a position corresponding to that illustrated in Figure 9, thus opening the steam admission valve of this cylinder head to permit steam to enter the cylinder and cause return movement of the piston 29. After the roller 85 reaches the bottom of the cam slot 84 further movement of the cam plates to the left from the position illustrated in Figure 15 is of no effect because the rollers of both valves which are controlled by the cam plates 79—79', respectively, ride in the horizontal portions of their respective cam slots. A reverse movement of the cam plates from the extreme left hand position produces a reverse action of the valves, resulting first in a closure of the steam admission valve in the valve chamber 33' and then an opening of the steam admission valve in the valve chamber 33.

The exhaust valves in the cylinder heads 11 and 12 are controlled jointly and operate in the same general manner as do the steam admission valves. The relationship of the cams which control the exhaust of steam from the cylinder is such that a proper relationship is obtained in the operation of the respective admission and exhaust valves.

While a cam could be used to operate each valve of a railroad locomotive, the size of the valve and the maximum speed of the engine are generally such that a positive connection between the valve and the reversing gear is preferable. In lieu of the cam plates 79—79' and the corresponding roller 85, it is possible to provide linkages, each of which is positively connected to one of the valve stems 43 for operating and guiding it. Such an arrangement is shown in Figures 17 to 21, inclusive. Figure 17 is a view corresponding to Figure 15 and showing a pair of link mechanisms for controlling the steam admission valves for the cylinder heads 11 and 12, respectively. The parts of the linkage for operating the admission valve in the head 12 have been designated by the same reference numerals as the corresponding operating parts for admission valve in the head 11, with the subscript "a" added. In this figure the mechanisms have been shown with the valve stem 43 of the cylinder 11 in its valve closed position and the valve stem 43a of the cylinder head 12 in its valve open position. The linkage for controlling the valve stem 43 in the cylinder head 11 is enclosed in a casing 101 and the corresponding linkage for controlling the valve stem 43a of the cylinder head 12 is enclosed in a casing 101a. The casings and the linkages are of identical construction except that one is right handed and the other is left handed, and they are mounted in place on the respective cylinder heads with the links in the two casings in opposite relationship. The casing 101 is rigidly but removably mounted on the cylinder head 11, preferably by bolting to the flange of the valve stem gland 75, suitable gaskets being interposed to provide a liquid tight seal between the casing 101 and the flange of the gland 75. The casing is of a generally rectangular shape and is provided with a removable cover 102 suitably secured in place and gasketed to form a liquid tight seal. The various cranks and links, to be presently described, are mounted in the casing with the various fixed pivots supported by the rear casing wall so that the cover 102 can be removed without disturbing the positions and mountings of the links. Four operating mechanisms are provided, one for each of the four valves of the engine. They can be identical except as two are right handed and two are left handed. The two steam admission valve operating mechanisms, illustrated in Figure 17, are interconnected by a rod 104 which is connected in turn to the valve control rod 24 of Figure 1 by a clevis or the like 105, so that longitudinal movement of the valve control rod 24 results in actuation of the linkages in the casings 101 and 101a for controlling the steam admission valves at the opposite ends of the cylinder. Likewise the corresponding mechanisms for controlling the two exhaust valves are similarly interconnected.

A description will now be given of the construction of the mechanism within the casing 101. The upper end of the valve stem 43 is guided in a straight line motion by a linkage comprising a floating member 110 pivotally connected to the valve stem 43 at a pivot 111 and mounted on two pivots 112 and 113 at the ends of equal cranks 114 and 115 that are pivoted about fixed pivots 116 and 117. The center of the pivot 111 is on the perpendicular bisector of a line joining the centers of the movable pivots 112—113. The proportions of the linkages are such that the center of the pivot 111 moves in a straight line, within the range of travel here utilized. For a further description of the straight line mechanism reference may be made to my co-pending application, Serial No. 224,862, filed August 15, 1938, Patent No. 2,198,635 granted April 30, 1940.

The valve stem 43 is actuated by means of a linkage comprising cranks 120 and 121 pivoted about fixed pivots 122 and 123 and interconnected by a link 124 pivoted to the cranks 120 and 121 by pivots 125—126. Another link 127 is pivoted to the mid point of the link 124 by a pivot 128 and is pivoted at its opposite end to the pivot 111. The crank 120 is keyed to its pivot pin 122 and is adapted to be rotated by turning of a crank 130 which is keyed to the pivot 122 on the outside of the casing 101.

The rod 104 which interconnects the cranks 130—130a of the two admission valve operating mechanisms is connected in turn to the valve control rod 24 of Figure 1 by a pivotal connection 134, so that longitudinal movement of the valve control rod 24 causes turning of the two cranks 130 of the steam admission control mechanisms at opposite ends of the cylinder. Likewise the mechanisms for controlling the exhaust valves are similarly interconnected.

An explanation will now be given of the manner of operation of the linkages within the casing 101. Assume that the links and cranks are in the positions illustrated in Figure 17, in which positions the steam admission valve in the cylinder head 11 is closed and the steam admission valve in the cylinder head 12 is open. As the valve control rod 24 moves to the right it turns the crank 130 and the crank 130a in a clockwise direction, thus producing a corresponding direction of rotation of the cranks 120 and 120a. As the crank 120 moves from the position illustrated in Figure 17 to the position illustrated in Figure 20, the crank 121 and the links 124 and 127 assume the positions illustrated in Figure 20. During this time the center of the pivot 111 remains substantially stationary, with the result that the admission valve in the cylinder head 11 is subjected to substantially no motion. During this movement of the valve control link 24, the crank 120a moves from the position illustrated in Figure 17 to the position illustrated in Figure 20, thereby producing a corresponding motion of the crank 121a and the link 124a. This motion of the link 124a causes the link 127a to raise the pin 111a. The link 127a does not guide the path of movement of the pin 111, but the T-shaped member 110a does guide that pin in a straight line. As a result the valve stem 43a is raised to close the steam admission valve in the cylinder head 12. Continued movement of the valve control rod 24 to the right, as seen in Figures 17, 20 and 21, produces the following effect: As the crank 120a, the link 124a and the crank 121a move from the position illustrated in Figure 20 to the position illustrated in Figure 21 there is substantially no movement imparted thereby to the pivot pin 111a. Therefore, the valve stem 43a now remains substantially stationary. At the same time the crank 120 moves from the position illustrated in Figure 20 to that illustrated in Figure 21. The crank 121 and the link 124 cause the link 127 to force the pivot 111 downwardly, the pivot being guided in a straight line by the member 110. The valve stem 43 is thus moved to move the steam admission valve in the cylinder head 11 to its open position.

The two exhaust valves of each cylinder are each controlled in the same manner as are the two admission valves.

The linkage comprising the cranks 120 and 121 and links 124 and 127 is a linkage that is known to the art. To this linkage I have added the straight line guiding mechanism comprising the links 110, 114 and 115. The combination of the two linkages for moving the valve stem 43 up and down and guiding it in a straight line can be enclosed in a single box in which the top of the valve stem reciprocates, and from which extends only the single rotary pin or shaft for actuating the linkage. As a result of this construction the box 101 may be sealed and filled with a suitable lubricant.

With mechanism such as above described, operating two valves by a common rod, such as the rod 104 (one valve at each end of the cylinder), when the shifting lever is in the mid position such that only the component of motion that is derived from the cross head is active, there is substantially no movement of either valve and certainly no effective movement (opening or closing) of either valve. When the shifting lever is at either end of its range of travel the rod moves one valve from its closed to its wide open position while transmitting almost no movement to the other of the two interconnected valves. It then closes the first valve, brings it to rest, and then moves the second valve from the closed to the wide open position while transmitting almost no movement to the first valve. The links within the casing 101 thus perform the function of the cams of Figure 15 while at the same time maintaining a positive connection between the valve actuator and the valve stem. Each housing 101—101a can be bolted to the cylinder head so that the assembly of a cylinder head, valves and valve operating mechanisms can be handled as a single unit which can be assembled and completely adjusted at a work bench before it is attached to the cylinder. In order to attach this unit to a cylinder of a standard railway locomotive having the usual single valve type of engine, it is only necessary to burn off or otherwise remove the existing valve chests and rebore the cylinder and provide a cylinder liner to close off the present steam ports. The new cylinder heads with built-in valves, valve mechanism, and parts of the steam piping, all of which has been previously properly adjusted in the shop, may then be positioned on the cylinder and bolted in place. In some cases it may be desirable to shorten the barrel on the existing locomotive, including the removal of the existing bolting flanges. Under such circumstances the cylinder heads at opposite ends of the cylinder would then be held in place by rods of sufficient length to pass through the cylinder heads at opposite ends. In still other cases, in which space limits are such that the cross head would interfere with the new cylinder head, it may be desirable to substitute for the existing cross head and guides a straight line mechanism for guiding the end of the piston rod in a straight line. The straight line mechanism may be of the construction described in my said Patent No. 2,198,635, and may comprise essentially the straight line mechanism 110, 114 and 115 of Figure 17, mounted about two fixed pivots such as 116—117.

In some instances it may be desirable to provide a mechanical leverage between the valve stem and the end of the link 127 (Fig. 17) that moves the valve stem up and down, in order to provide a more rapid motion for the valve stem. Such an arrangement is illustrated in Figures 22 and 23 wherein Figure 22 shows the linkages in a position with the valve stem 43 of the admission valve in the cylinder head 11 closed and the valve stem 43a of the admission valve in the cylinder head 12 open. Figure 23 shows the positions of the linkage mechanism when the two valves are moved to their alternate positions. Insofar as links, cranks and levers in this mechanism are of the same construction as in the mechanism illustrated in Figure 17, the same reference numerals have been used. The mechanism within the casing 101' includes the cranks 120 and 121 interconnected by a link 124 and having a link 127 pivoted thereto, all as was previously described in connection with Figure 17. The crank 120 is rotated, as before, by a crank 130 which rotates the crank 120 and is in turn rotated by the valve control rod 24 through a clevis or the like 105. The movement of the end of the link 127 will therefore be the same as that previously described insofar as concerns the non-movement of the center of the pivot 111 during a portion of the movement of the crank 120. The straight line operating mechanism here shown is substantially the same as was previously described and includes the pair of equal links 114 and 115 pivoted about stationary pivots 116 and 117 and having a floating member 110 pivoted to the ends of the links 114—115 about pivots 112 and 113. The floating member 110 is pivotally connected to the valve stem 43 by a pivot located at 140, the center of the pivot 140 being located on the perpendicular bisector of a line joining the centers of the pivots 112 and 113, and spaced from such line by such an amount that the center point 140 moves in a straight line upon actuation of the floating member 110 within the range of travel of the mechanism. The proportion of the members and the spacing of the stationary pivots of this straight line mechanism is as disclosed in my Patent No. 2,198,635, above referred to. The floating member 110 has an arm 141 as an integral part thereof. The end of this arm is pivotally connected to the end of the link 127 by the pivot pin located at 111. The arm 141 controls the path of movement of the center point of the pin 111, thus controlling the path of movement of the adjacent end of the link 127, the center point 111 following the locus indicated by the dotted line 143. A small amount of movement of the pin 111 along the locus line 143 produces a comparatively greater movement of the straight line point 140. It may further be noted that the mechanical advantage or leverage thus obtained varies throughout the path of movement of the pivot center 111. At one end of the travel of the center 111 a small amount of movement produces a comparatively great amount of movement of the pivot 140. This corresponds to the point of initial opening or final closing of the valve, so that there is a very rapid opening and closing movement of the valve.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. In a steam engine having a cylinder and a cylinder head at an end thereof, a sliding valve in said head, a valve seat, said valve and seat including a pair of relatively movable hollow tubular members one within the other with ports formed in one of the members and opened and closed by relative sliding of the tubular members, the inner member comprising a plurality of spaced rings and a common rod supporting said rings, and the outer member comprising a tube slotted between adjacent spaced rings of the first member, each slotted portion being divided into two halves of which one half communicates with the cylinder and the other half communicates with the cylinder head.

2. In an engine, a valve seat comprising a hollow cylindrical sleeve having a plurality of ports spaced from one another longitudinally of the sleeve and forming a plurality of passageways leading into the sleeve, a stem mounted for movement in the sleeve, a plurality of rings mounted on the stem in cooperative relation to the ports and movable by the stem to open said passageways simultaneously and to close said passageways simultaneously, said sleeve having another plurality of ports also spaced longitudinally of the sleeve and alternating with the first mentioned ports and forming a plurality of passageways leading out of the sleeve.

3. In an engine, a cylinder, a cylinder head, a valve seat comprising a hollow cylindrical sleeve having a plurality of ports spaced from one another longitudinally of the sleeve, alternate ports opening into the cylinder and the intervening alternate ports opening into the interior of the cylinder head, and means for simultaneously closing one set of alternate ports.

4. In an engine, a cylinder, a cylinder head, a valve seat comprising a hollow cylindrical sleeve having a plurality of groups of ports spaced from one another longitudinally of the sleeve, one port of each group opening into the cylinder and one port of each group opening into the interior of the cylinder head, the ports opening into the cylinder head alternating with the ports opening into the cylinder, and means for simultaneously closing all the ports opening into the cylinder comprising a stem mounted for movement in the sleeve and a plurality of open ended rings mounted on the stem and having a sliding fit with said sleeve at said ports.

5. A valve having an inlet and an outlet and a wall between the two, said wall having a plurality of spaced loop-like bends with aligned openings therein forming communicating ports between the inlet and outlet sides, a plurality of coaxial open ended rings movable axially through said openings and each of a width sufficient to close communication between the inside and outside of each bend, means joining the rings into a unitary structure for joint movement, the distance between adjacent bends being of the order of twice the depth of a bend and of the order of twice the length of a ring said rings being movable from a position closing communication between the inside and outside of each bend to a position permitting communication between the inside and outside of each bend.

6. An engine including a cylinder having a cylinder head at an end thereof, a wall between the outer end of the head and the cylinder forming a steam chamber in the head separate from the cylinder, said wall including a plurality of spaced loop-like bends, aligned openings in the bends forming communicating ports between the cylinder and the chamber, a plurality of coaxial rings movable through said openings and each of a width sufficient to close the space between openings at adjacent sides of a bend to close communication between the cylinder and the chamber, and means joining the rings into a unitary structure for joint movement, the distance between adjacent bends being substantially greater than the depth of a bend, said rings being movable from a position closing the space between openings at adjacent sides of each bend to a position permitting communication between the chamber and cylinder through the openings.

7. In combination, a valve seat comprising a tubular member having a plurality of ports formed therein all opening through the periphery of the tubular member, the ports being around substantially the entire periphery of the member and adjacent groups of ports being spaced from each other lengthwise of the member, and a valve extending through the seat and including a rod and a plurality of spaced rings actuated by the rod and slidable snugly in the tubular members to cover alternate ports to control the flow of fluid through the device.

8. In combination, a valve seat comprising a tubular member having a plurality of groups of ports formed in the periphery thereof, there being separate receiving and discharging openings for each group with the respective receiving and discharging openings spaced from one another lengthwise of the tubular member, the ports of each group being around substantially the entire periphery of the member and the groups of ports being spaced from each other lengthwise of the member, and a valve extending through the seat and including a central rod and a plurality of spaced rings mounted on and actuated by the rod and slidable snugly in the tubular members to cover alternate openings to control the flow of fluid through the device, each of the rings being open at its two opposite ends for permitting the flow of fluid through the rings.

9. In combination, a steam engine having at least two separate valves, each of the valves including a longitudinally movable valve stem, a separate operating linkage positively connected to each stem and a common operating rod positively connected to at least two of the operating linkages, each of the two last mentioned linkages including means for maintaining the valve stem associated therewith stationary during substantially the entire effective operative movement of the valve stem that is associated with the other of the two linkages.

10. In combination with two sliding valves, a common operating rod for the valves, and means positively connecting the valves with the rod and producing sequential operation of the valves by a continuous operation of the rod, said means comprising two similar linkages each connecting a valve with the rod, each linkage including an actuated member connected to the rod and an actuating member operatively connected to its associated valve and means pivotally connecting the two members and guiding the actuating member to maintain its connection with the valve stationary throughout substantially half of the stroke of the rod, the linkages of the two valves being in opposite phase relationship so that one actuating member has no movement imparted to at least a portion thereof while the actuating member of the other valve moves through approximately one-half of its range of travel.

11. In combination with two sliding valves, a common operating rod for the valves, and means positively connecting the valves with the rod and producing sequential operation of the valves by a continuous operation of the rod, said means comprising two similar linkages each connecting a valve with the rod, each linkage including an actuated member connected to the rod and an actuating member operatively connected to its associated valve and means pivotally connecting the two members and maintaining the connection between the actuating member and the valve stationary while the actuated member moves through approximately one-half of its range of travel, the two linkages being in such relative positions that the actuating member of one linkage is in its position of no effective movement during substantially the entire travel of the valve actuated by the other linkage.

12. In combination with two sliding valves, a common operating rod for the valves, and means positively connecting the valves with the rod and producing sequential operation of the valves by a continuous operation of the rod, said means comprising two similar linkages of the type in which one point has substantially no movement during half of the stroke of the linkage and is actuated during the other half of the stroke, each linkage including a member connected to the rod and an actuating member operatively connected to its associated valve at said point, and means associated with the respective linkages for guiding the movement of the associated valve in a straight line, said last named means comprising a plurality of pivotally connected members pivoted about two spaced fixed pivots.

13. In combination, a pair of cranks pivoted about spaced parallel pivots, a link pivotally connecting both cranks, a second link pivoted to the mid point of the first link and actuated thereby, and means for guiding the movement of a point on the second link, spaced from the pivotal connection between the links, to substantially a straight line, said means including a straight line linkage mechanism.

14. In combination, a pair of cranks pivoted about spaced parallel pivots, a link pivotally connecting both cranks, a second link pivoted to the mid point of the first link and actuated thereby, and means for guiding the movement of a point on the second link, spaced from the pivotal connection between the links, to substantially a straight line, said means including a straight line linkage mechanism having at least one fixed pivot, said linkage mechanism being actuated by the second link, a valve having a longitudinally movable valve stem, and a pivotal connection between the valve stem and that point on the linkage mechanism which moves in a straight line.

ALLEN M. ROSSMAN.